United States Patent
Kwon et al.

(10) Patent No.: US 11,402,934 B2
(45) Date of Patent: Aug. 2, 2022

(54) TOUCH SENSOR MODULE, WINDOW STACK STRUCTURE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Hye Rim Kwon, Incheon (KR); Tae Bong Kim, Gyeonggi-do (KR); Dong Jin Son, Chungcheongnam-do (KR); Sung Woo Yu, Gyeonggi-do (KR); Min Ho Lim, Seoul (KR)

(73) Assignee: DONGWOO FINE-CHEM CO., LTD., Jeollabuk-Do (KR)

(*) Notice: Subject to any disclaimer, the term of this patent is extended or adjusted under 35 U.S.C. 154(b) by 0 days.

(21) Appl. No.: 17/117,874

(22) Filed: Dec. 10, 2020

(65) Prior Publication Data

US 2021/0096668 A1 Apr. 1, 2021

Related U.S. Application Data

(63) Continuation of application No. PCT/KR2019/005912, filed on May 17, 2019.

(30) Foreign Application Priority Data

Jun. 19, 2018 (KR) .................. 10-2018-0070437

(51) Int. Cl.
*G06F 3/041* (2006.01)
*G06F 3/045* (2006.01)
*B32B 7/12* (2006.01)
*B32B 23/08* (2006.01)
*B32B 27/30* (2006.01)
*B32B 27/36* (2006.01)

(52) U.S. Cl.
CPC .............. *G06F 3/041* (2013.01); *B32B 7/12* (2013.01); *B32B 23/08* (2013.01); *B32B 27/306* (2013.01);
(Continued)

(58) Field of Classification Search
CPC ...................................... B32B 37/14
See application file for complete search history.

(56) References Cited

U.S. PATENT DOCUMENTS 9,287,329 B1 3/2016 Lee et al.
2011/0179997 A1* 7/2011 Hayata .............. C09J 7/243
118/505

(Continued)

FOREIGN PATENT DOCUMENTS

KR 10-2011-0087229 A 8/2011
KR 10-2015-0144913 A 12/2015

(Continued)

OTHER PUBLICATIONS

International Search Report for PCT/KR2019/005912 dated Aug. 27, 2019.

(Continued)

*Primary Examiner* — Nan-Ying Yang
(74) *Attorney, Agent, or Firm* — The PL Law Group, PLLC (57) ABSTRACT

A touch sensor module according to an embodiment of the present invention includes a touch sensor layer including sensing electrodes and traces branching from the sensing electrodes, a flexible circuit board electrically connected to the traces at one end portion of a top surface of the touch sensor layer, a supporting structure commonly and partially covering the flexible circuit board and the touch sensor layer, and an adhesive layer formed on at least one surface of the touch sensor layer. The adhesive layer has a flexural rigidity in a range from 0.01 to 5 N·nm. Damages and delamination of electrodes and wirings included in the flexible circuit board and the touch sensor layer are prevented by the supporting structure.

17 Claims, 5 Drawing Sheets

(52) U.S. Cl.
CPC ........ *B32B 27/36* (2013.01); *B32B 2457/208* (2013.01); *G06F 2203/04102* (2013.01)

(56) References Cited

U.S. PATENT DOCUMENTS

| | | | | |
|---|---|---|---|---|
| 2016/0147361 A1* | 5/2016 | Ahn | ......................... | G09G 3/20 345/173 |
| 2017/0192586 A1* | 7/2017 | Lin | ....................... | G06F 1/1626 |

FOREIGN PATENT DOCUMENTS

| | | |
|---|---|---|
| KR | 10-2016-0039767 A | 4/2016 |
| KR | 10-2016-0061563 A | 6/2016 |
| KR | 10-2017-0112792 A | 10/2017 |
| KR | 10-2018-0033353 A | 4/2018 |
| KR | 10-2018-0033364 A | 4/2018 |
| KR | 10-2018-0049464 A | 5/2018 |
| KR | 10-2018-0052085 A | 5/2018 |
| WO | WO 2013/063176 A1 | 5/2013 |
| WO | WO 2017/187805 A1 | 11/2017 |
| WO | WO2018/079249 A1 | 5/2018 |

OTHER PUBLICATIONS

Office action dated Feb. 22, 2022 from Korean Patent Office in a counterpart Korean Patent Application No. 10-2018-0070437 (English translation is also submitted herewith.).

* cited by examiner

TOUCH SENSOR MODULE, WINDOW STACK STRUCTURE INCLUDING THE SAME AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2019/005912, filed May 17, 2019 which claims priority to the benefit of Korean Patent Application No. 10-2018-0070437 filed in the Korean Intellectual Property Office on Jun. 19, 2018, the entire contents of which are incorporated herein by reference.

BACKGROUND

1. Field

The present invention relates to a touch sensor module, a window stack structure including the same and an image display device including the same. More particularly, the present invention related to a touch sensor module including a sensing electrode and an insulation structure, a window stack structure including the same and an image display device including the same

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

As a flexible display capable of being bent or folded is being developed, the touch sensor having proper properties, structures and constructions for being applied to the flexible display is also needed. Additionally, a proper locational and structural design of the touch sensor may be required in consideration of a connection reliability with a main board, a circuit board, etc., in the image display device.

For example, a touch sensor or a touch screen panel combined with various image display devices are being developed as disclosed in Korean Patent Published Publication No. 2014-0092366.

SUMMARY

According to an aspect of the present invention, there is provided a touch sensor module having improved electrical and mechanical reliability.

According to an aspect of the present invention, there is provided a window stack structure including a touch sensor module having improved electrical and mechanical reliability.

According to an aspect of the present invention, there is provided an image display device including a touch sensor module having improved electrical and mechanical reliability.

(1) A touch sensor module, including: a touch sensor layer including sensing electrodes and traces branching from the sensing electrodes; a flexible circuit board electrically connected to the traces at one end portion of a top surface of the touch sensor layer; a supporting structure commonly and partially covering the flexible circuit board and the touch sensor layer; and an adhesive layer formed on at least one surface of the touch sensor layer, wherein the adhesive layer has a flexural rigidity defined by Equation 1 in a range from 0.01 to 5 N·nm:

$$\text{Flexural Rigidity} = Eh^3/12(1-v^2) \qquad \text{[Equation 1]}$$

wherein, in Equation 1, E represents a tensile modulus (MPa) of the adhesive layer, h represents a thickness (μm) of the adhesive layer, and v represents a Poisson's ratio of the adhesive layer.

(2) The touch sensor module according to the above (1), wherein the adhesive layer includes a first adhesive layer formed on the top surface of the touch sensor layer.

(3) The touch sensor module according to the above (2), wherein the supporting structure contacts the first adhesive layer.

(4) The touch sensor module according to the above (1), wherein the adhesive layer includes a second adhesive layer formed on a bottom surface of the touch sensor layer.

(5) The touch sensor module according to the above (4), further including a protective film combined with the touch sensor layer via the second adhesive layer.

(6) The touch sensor module according to the above (1), wherein the adhesive layer includes a first adhesive layer and a second adhesive layer formed on the top surface and a bottom surface of the touch sensor layer, respectively, and at least one of the first adhesive layer and the second adhesive layer has the flexural rigidity in the range from 0.01 to 5 N·nm.

(7) The touch sensor module according to the above (1), wherein the adhesive layer has the flexural rigidity in a range from 0.1 to 1 N·nm.

(8) The touch sensor module according to the above (1), wherein the touch sensor layer includes a display area in which the sensing electrodes are disposed, a trace area in which the traces are disposed, and a connection area in which terminal end portions of the traces are disposed.

(9) The touch sensor module according to the above (8), wherein the flexible circuit board is electrically connected to the terminal end portions of the traces in the connection area, and the supporting structure covers the connection area and the trace area in a planar view.

(10) The touch sensor module according to the above (9), wherein the touch sensor layer further includes a margin area in which some of the sensing electrodes are arranged, and the margin area is interposed between the display area and the trace area.

(11) The touch sensor module according to the above (10), wherein the supporting structure covers the margin area in the planar view.

(12) The touch sensor module according to the above (8), further including an optical layer disposed on the display area of the touch sensor layer, and the supporting structure and the optical layer are spaced apart in a horizontal direction to form a gap.

(13) The touch sensor module according to the above (12), wherein a spacing distance between the optical layer and the supporting structure is 500 μm or less.

(14) The touch sensor module according to the above (12), wherein the optical layer includes at least one of a polarizer, a polarizing plate, a retardation film, a reflective sheet, a brightness enhancing film or a refractive index matching film.

(15) The touch sensor module according to the above (1), wherein the supporting structure includes a substrate layer and a supporting layer formed on the substrate layer, and the supporting layer includes an adhesive material.

(16) The touch sensor module according to the above (15), wherein the supporting layer contacts the flexible circuit board and the touch sensor layer.

(17) A window stack structure, including: a window substrate; and the touch sensor module according to any one of the above (1) to (16) stacked on one surface of the window substrate.

(18) An image display device, including: a display panel; and the touch sensor module according to any one of the above (1) to (16) stacked on the display panel.

(19) The image display device according to the above (18), further including a main board disposed under the touch sensor module, wherein a portion of the touch sensor layer of the touch sensor module and the flexible circuit board are bent together with the supporting structure to be electrically connected to the main board.

A touch sensor module according to embodiments of the present invention may include a supporting structure partially covering a touch sensor layer and a flexible printed circuit board. When the touch sensor module is folded or bent, delamination of the flexible printed circuit board may be prevented by the supporting structure and damages to sensing electrodes or traces in a bending area may be also prevented.

The touch sensor module may include an adhesive layer having a predetermined range of a flexural rigidity. Defects such as damage and delamination of the flexible circuit board, electrodes and traces may be prevented through the adhesive layer even during a drastic bending.

In some embodiments, the touch sensor module may further include an optical layer disposed on the touch sensor layer. A gap may be formed between the supporting structure and the optical layer. Thus, a bending area of the touch sensor layer may be formed without degrading an image display from a display area overlapping the optical layer.

The touch sensor module may be fabricated as a substrate-less type thin film and may be effectively applied to an image display device such as a flexible display.

DETAILED DESCRIPTION OF THE EMBODIMENTS

According to exemplary embodiments of the present invention, there is provided a touch sensor module that includes a touch sensor layer, a flexible printed circuit board connected to an end portion of the touch sensor layer, a supporting structure partially and commonly covering the touch sensor layer and the flexible circuit board, and an adhesive layer being formed on at least one surface of the touch sensor layer and having a predetermined range of flexural rigidity.

According to exemplary embodiments of the present invention, an image display device including the touch sensor module is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, for example, two directions being parallel to a top surface of a touch sensor layer or a protective film and perpendicular to each other are defined as a first direction and a second direction. For example, the first direction may correspond to a length direction of the touch sensor module, and the second direction may correspond to a width direction of the touch sensor module. Additionally, a direction vertical to the first and second directions may be defined as a third direction. For example, the third direction may correspond to a thickness direction of the touch sensor module.

Figure 1:
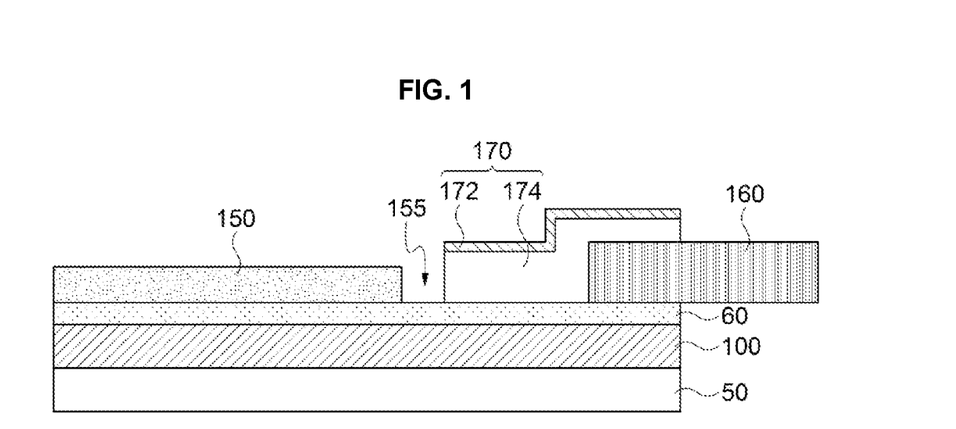
FIGS. 1 to 3 are schematic cross-sectional views illustrating touch sensor modules in accordance with exemplary embodiments.
Figure 2:
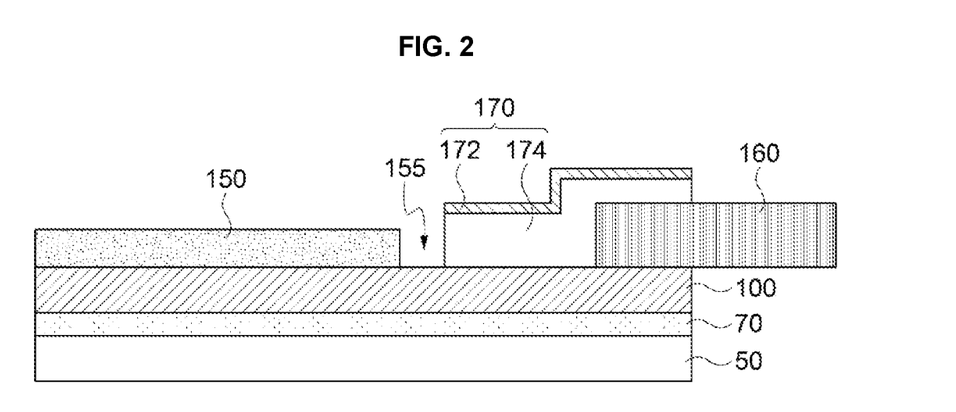
Figure 3:
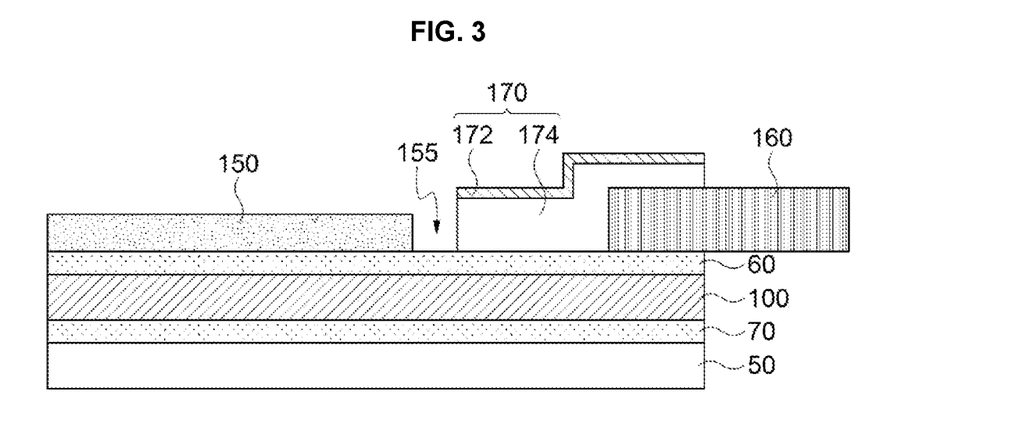

FIGS. 1 to 3 are schematic cross-sectional views illustrating touch sensor modules in accordance with exemplary embodiments.

Referring to FIG. 1, the touch sensor module may include a touch sensor layer 100, a flexible circuit board 160 connected to an end portion of the touch sensor layer 100, and a supporting structure 170 partially covering the flexible circuit board 160 and the touch sensor layer 100.

In some embodiments, the touch sensor layer 100 may be disposed on a protective film 50. The protective film 50 may include, e.g., an inorganic insulating film and/or an organic insulating film. For example, a polymer film including cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethylmethacrylate (PMMA), or the like may be used as the protective film 50.

In an embodiment, the protective film 50 may be formed to protect sensing electrodes and traces during a fabrication of the touch sensor layer 100, and may be removed after forming the touch sensor module.

The touch sensor layer 100 may include conductive patterns such as the sensing electrode and the traces, and may further include an insulating layer for mutually insulating the conductive patterns. Elements and structures of the touch sensor layer 100 will be described later in more detail with reference to FIGS. 4 and 5.

A flexible circuit board (FPCB) 160 may be disposed on an end portion of the touch sensor layer 100 and may be electrically connected to the traces included in the touch sensor layer 100. In an embodiment, a terminal portion or a pad portion formed at an end of the trace and a circuit wiring included in the flexible circuit board 160 may be electrically connected to each other via a conductive intermediate structure such as an anisotropic conductive film (ACF).

The flexible circuit board 160 may include, e.g., a core layer including a resin or a liquid crystal polymer, and the circuit wiring printed on the core layer. A coverlay layer covering the circuit wiring may be further formed on the core layer. A portion of the coverlay layer may be removed to expose a portion of the circuit wiring that may be connected to the terminal portion or the pad portion of the touch sensor layer 100.

The touch sensor layer 100 may further include a passivation layer that may protect the sensing electrode and the traces. In this case, a portion of the passivation layer formed on a connection area connected to the flexible circuit board 160 may be removed.

The supporting structure 170 may be formed on portions of the flexible circuit board 160 and the touch sensor layer 100 disposed on the connection area. Accordingly, the supporting structure 170 may commonly and partially cover end portions of the touch sensor layer 100 and the flexible circuit board 160.

The supporting structure 170 may serve as a protective pattern to prevent damages such as delamination, cracks, etc., of the sensing electrodes and the traces caused when the flexible circuit board 160 is detached, folded or bent by an external stress in the connection area. Further, the flexible circuit board 160 and/or the touch sensor layer 100 may be held by the supporting structure 170 when the protective film 50 is removed as described above so that mechanical damages may be reduced or prevented.

The supporting structure 170 may have a multi-layered structure. For example, the supporting structure 170 may include a substrate layer 172 and a supporting layer 174 formed on a surface of the substrate layer 172. The supporting layer 174 may include, e.g., an acrylic, silicone, urethane, and/or rubber-based adhesive material, and may hold the end portions of the flexible circuit board 160 and the touch sensor layer 100 commonly in the connection area.

The substrate layer 172 may include, e.g., a polymer material as described above in the protective film 50.

The touch sensor module may further include an optical layer 150. The optical layer 150 may include a film or a layer structure widely known in the related art for improving an image visibility of an image display device. Non-limiting examples of the optical layer 150 may include a polarizing plate, a polarizer, a retardation film, a reflective sheet, a luminance enhancing film, a refractive index matching film, etc. These may be used alone or in a multi-layered structure including at least two thereof.

In exemplary embodiments, the optical layer 150 may be located at substantially the same layer or the same level as that of the supporting structure 170. The optical layer 150 and the supporting structure 170 may be horizontally spaced apart by a predetermined distance. Accordingly, a gap 155 may be formed between the optical layer 150 and the supporting structure 170.

The gap 155 may serve as a margin area in consideration of folding or bending of the touch sensor module. Further, the gap 155 may serve as a margin area for alignment of the supporting structure 170. A spacing distance between the supporting structure 170 and t optical layer 150 may be properly achieved so that an image quality and a flexibility of an image display device, and protection of conductive structures such as the sensing electrodes may be properly implemented.

In some embodiments, the spacing distance between the optical layer 150 and the supporting structure 170 may be about 500 μm or less. If the spacing distance exceeds about 500 μm, effects of suppressing damages and delamination of the flexible circuit board 160 and the touch sensor layer 100 from the supporting structure 170 may not be sufficiently implemented.

In an embodiment, in consideration of forming a bending area by the gap 155, the spacing distance may be adjusted in a range from about 50 to 500 μm.

In exemplary embodiments, a first adhesive layer 60 for attaching the optical layer 150 may be formed on a top surface of the touch sensor layer 100. The supporting structure 170 and the flexible circuit board 160 may also contact the first adhesive layer 60. In this case, a portion of the first adhesive layer 60 in the connection area may be partially removed to connect the flexible circuit board 160 and the terminal portion or the pad portion included in the touch sensor layer 100.

The first adhesive layer 60 may be interposed between the touch sensor layer 100 and the supporting structure 170, so that a bonding force through the supporting structure 170 may be more enhanced when folding or bending occurs to improve mechanical reliability of the flexible circuit board 160 and the touch sensor layer 100.

In exemplary embodiments, in consideration of maintaining reliability when the folding or bending occurs, the first adhesive layer 60 may have a flexural rigidity in a range from about 0.01 to 5 N·nm.

The term "flexural rigidity" used in the present application may be utilized as a parameter indicating a resistance to a stress generated when the folding or bending is applied, and may be calculated according to Equation 1 below.

$$\text{Flexural Rigidity} = Eh^3/12(1-v^2) \quad \text{[Equation 1]}$$

In Equation 1, E represents a tensile modulus (MPa) of the adhesive layer, h represents a thickness of the adhesive layer (μm), and v represents a Poisson's ratio of the adhesive layer.

If the flexural rigidity of the first adhesive layer 60 is less than about 0.01 N·nm, fractures of the first adhesive layer 60 may occur during the folding or bending, and the delamination of the supporting structure 170 and the flexible circuit board may not be sufficiently prevented. If the flexural rigidity of the first adhesive layer 60 exceeds about 5 N·nm, a hardness of the first adhesive layer 60 may be excessively increased and sufficient flexibility may not be obtained. In a preferable embodiment, the flexural rigidity of the first adhesive layer 60 may be adjusted in a range from about 0.1 to 1 N·nm.

The thickness and tensile modulus of the first adhesive layer 60 may be adjusted within the flexural rigidity range. In an embodiment, the first adhesive layer 60 may have a thickness from about 5 to 100 μm, and the first adhesive layer 60 may have a tensile modulus from about 100 to 3,000 MPa. For example, the tensile modulus may be adjusted by changing contents of components included in an adhesive composition to be described later and an amount of light used during a photo-curing.

For example, the first adhesive layer 60 may be formed using the adhesive composition comprising an acrylic copolymer, a cross-linking agent, a silane coupling agent and a solvent. The adhesive composition may have a photo-curability.

For example, the acrylic copolymer may be prepared by copolymerizing an alkyl (meth)acrylate monomer, an aromatic group-containing monomer and a cross-linkable monomer. The term "(meth)acrylate" herein is used to include both acrylate and methacrylate.

Examples of the alkyl (meth)acrylate monomer may include methyl (meth)acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, etc.

Examples of the aromatic group-containing monomer may include benzyl (meth)acrylate, styrene, vinyl toluene, etc.

Cohesive strength or adhesive strength may be increased by the cross-linkable monomer. For example, a hydroxy group-containing monomer and/or a carboxyl group-containing monomer may be included.

Examples of the hydroxy group-containing monomer may include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethylene glycol (meth)acrylate, 2-hydroxypropylene glycol (meth)acrylate, hydroxyalkyl alkylene glycol (meth)acrylate containing a C2-C4 alkylene group, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether, etc.

Examples of the carboxyl group-containing monomer may include (meth)acrylic acid, crotonic acid, maleic acid, itaconic acid, fumaric acid, 3-(meth)acryloylpropionic acid, an succinic anhydride ring-opening adduct of (meth)acrylate-based compound.

The cross-linking agent may induce an additional cross-linking reaction to the acrylic copolymer to improve cohesive strength of the adhesive layer. The type of the cross-linking agent may not be particularly limited, and may be appropriately selected among those commonly used in the art. For example, the cross-linking agent may include an isocyanate compound, an epoxy compound resin, a melamine resin, a urea resin, a dialdehyde-based compound, a methylol polymer, or the like.

The silane coupling agent may be added to improve an adhesion between the adhesive layer and the touch sensor layer 100. Non-limiting examples of the silane coupling agent may include vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanate propyl triethoxysilane, etc. These may be used alone or in a combination of two or more.

The solvent may include a common solvent used in a resin composition field. For example, alcohol-based (methanol, ethanol, isopropanol, butanol, propylene glycol methoxy alcohol, etc.), ketone-based (methyl ethyl ketone, methyl butyl ketone, methyl isobutyl ketone, diethyl ketone, dipropyl ketone, etc.), acetate-based (methyl acetate, ethyl acetate, butyl acetate, propylene glycol methoxy acetate, etc.), cellosolve-based (methyl cellosolve, ethyl cellosolve, propyl cellosolve, etc.), hydrocarbon-based (normal hexane, normal heptane, benzene, toluene, xylene, etc.) solvents may be used. These may be used alone or in combination of two or more.

The adhesive composition may further include commonly known additives, such as a plasticizer, a light stabilizer, a leveling agent, etc., within a range that may not degrade adhesive, durable and elastic properties of the first adhesive layer 60.

Referring to FIG. 2, the adhesive layer may be formed on a bottom surface of the touch sensor layer 100. In exemplary embodiments, a second adhesive layer 70 may be formed between the touch sensor layer 100 and the protective film 50.

The second adhesive layer 70 may serve as a support member providing the flexural rigidity to the touch sensor layer 100, and may serve substantially as a substrate after a removal of the protective film 50.

The second adhesive layer 70 may be formed using an adhesive composition substantially the same as or similar to that described above, and may have a flexural rigidity value within the above-described range. In exemplary embodiments, the flexural rigidity of the second adhesive layer 70 may be from about 0.01 to 5 N·nm, and in a preferable embodiment, from about 0.1 to 1 N·nm.

Referring to FIG. 3, an adhesive layer may be formed on each of the top surface and the bottom surface of the touch sensor layer 100. In exemplary embodiments, the first adhesive layer 60 may be formed on the top surface of the touch sensor layer 100, and the second adhesive layer 70 may be formed on the bottom surface of the touch sensor layer 100.

In exemplary embodiments, at least one of the first adhesive layer 60 and the second adhesive layer 70 may have the flexural rigidity value within the above-described range. In some embodiments, both the first adhesive layer 60 and the second adhesive layer 70 may have the flexural rigidity values within the above-described range.

According to the above-described exemplary embodiments, a connection reliability of the flexible circuit board 160 may be improved by the supporting structure 170, and mechanical damages due to the bending, folding, etc., may be prevented while maintaining proper flexibility by the adhesive layers 60 and 70. Accordingly, a touch sensor module that may be effectively applied to a flexible display and may have improved electrical and mechanical reliability may be provided.

Figure 4:
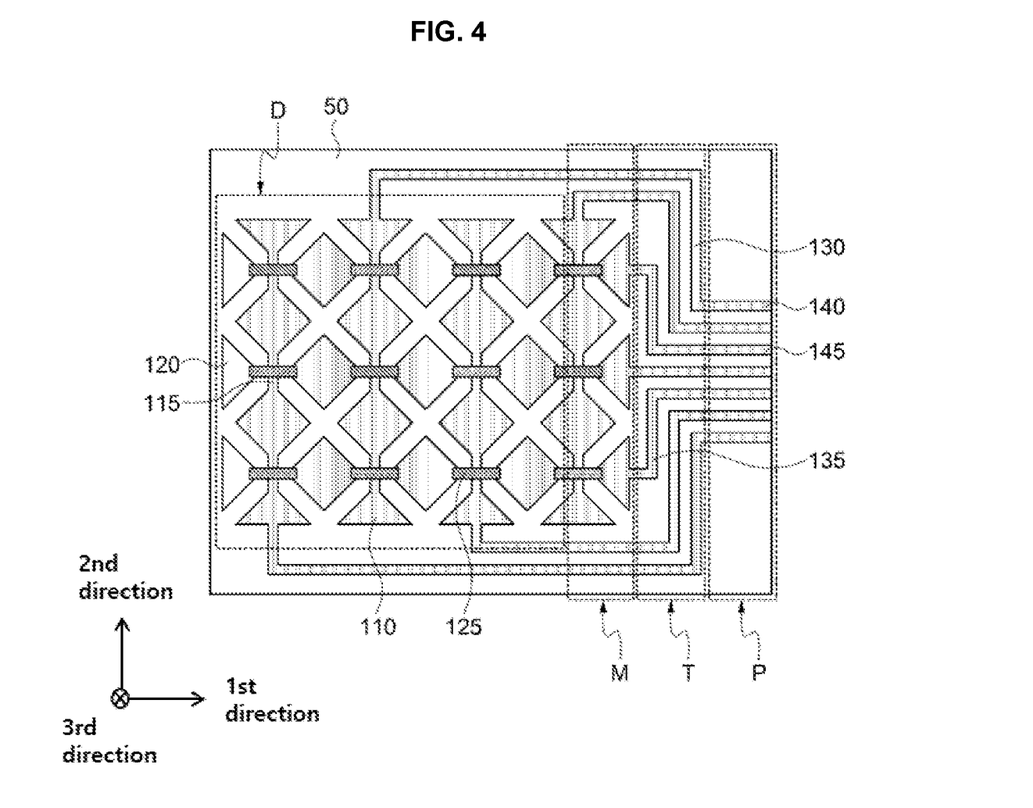
FIGS. 4 and 5 are top planar views illustrating touch sensor layers in accordance with exemplary embodiments.
Figure 5:
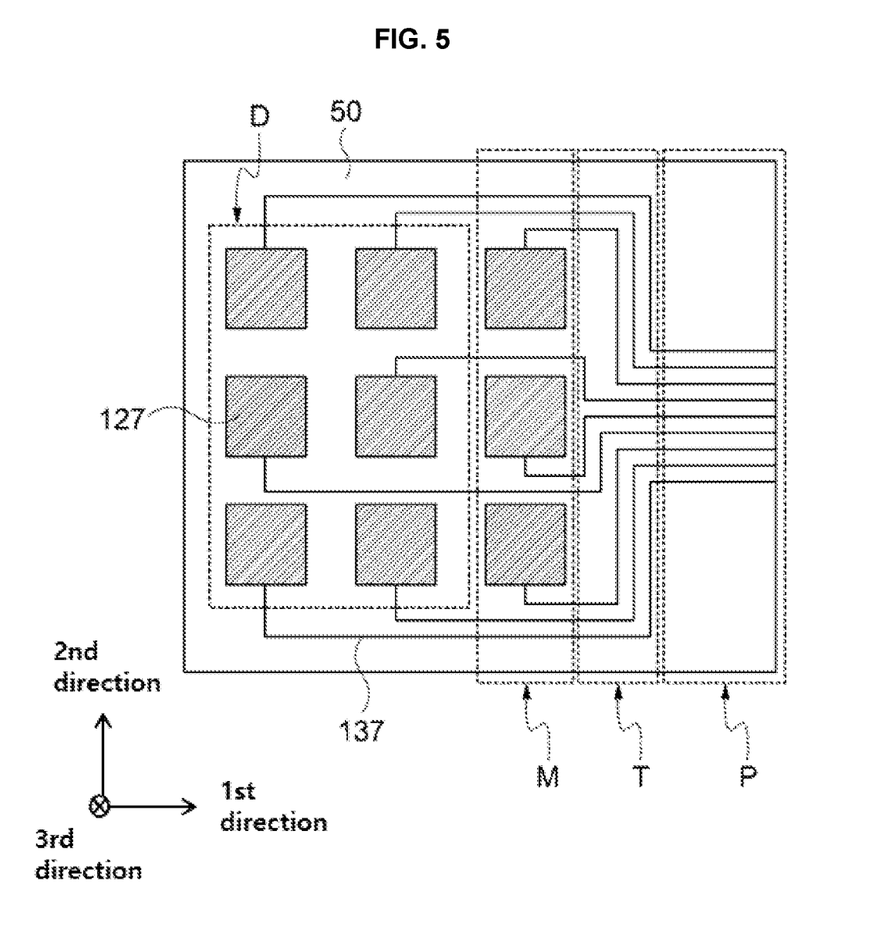

FIGS. 4 and 5 are top planar views illustrating touch sensor layers in accordance with exemplary embodiments.

Referring to FIG. 4, the touch sensor layer 100 may include sensing electrodes 110 and 120, and traces 130 and 135. In exemplary embodiments, the sensing electrodes 110 and 120 may be arranged to be operable by a mutual capacitance-type.

The touch sensor layer may include a display area D, a trace area T and a connection area P. The display area D may include a central area of the touch sensor layer, and may be an area from which an image of an image display device to which the touch sensor module is applied may be displayed to a user.

The connection area P may be disposed at one end portion of the touch sensor layer in the first direction, and may be an area in which an electrical connection with the flexible circuit board 160 may be implemented. As illustrated in FIG. 4, the display area D, the trace area T, and the connection area P may be sequentially disposed along the first direction. In some embodiments, a margin area M may be disposed between the display area D and the trace area T.

The sensing electrodes 110 and 120 may be arranged in the display area D of the touch sensor layer 100. In exemplary embodiments, the sensing electrodes 110 and 120 may include first sensing electrodes 110 and second sensing electrodes 120.

The first sensing electrodes 110 may be arranged, e.g., along the second direction (e.g., a width direction). Accordingly, a first sensing electrode row extending in the second direction may be formed by a plurality of the first sensing electrodes 110. A plurality of the first sensing electrode rows may be arranged along the first direction.

In some embodiments, the first sensing electrodes 110 neighboring in the second direction may be physically or electrically connected to each other by a connecting portion 115. For example, the connecting portion 115 may be integrally formed with the first sensing electrodes 110 at the same level as that of the first sensing electrodes 110.

The second sensing electrodes 120 may be arranged along the first direction (e.g., a length direction). In some embodiments, the second sensing electrodes 120 may each be physically separated into unit electrodes of an island type. In this case, the second sensing electrodes 120 neighboring in the first direction may be electrically connected to each other by a bridge electrode 125.

A plurality of the second sensing electrodes 120 may be connected to each other by the bridge electrodes 125 and may be arranged in the first direction such that a second sensing electrode column extending in the first direction may be formed. Further, a plurality of the second sensing electrode columns may be arranged along the second direction.

The sensing electrodes 110 and 120 and/or the bridge electrode 125 may include a metal, an alloy or a transparent conductive oxide.

For example, the sensing electrodes 110 and 120 and/or the bridge electrode 125 may be formed of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), or an alloy thereof (e.g., a silver-palladium-copper (APC) alloy). These may be used alone or in a combination thereof.

The sensing electrodes 110 and 120 and/or the bridge electrode 125 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 120 and/or the bridge electrode 125 may have a multi-layered structure including a transparent conductive oxide layer and a metal layer. For example, the sensing electrodes 110 and 120 and/or the bridge electrode 125 may have a triple-layered structure of a transparent conductive oxide layer-metal layer-transparent conductive oxide layer. In this case, flexible properties may be improved and resistance may be reduced by the metal layer while corrosion resistance and transparency may be improved by the transparent conductive oxide layer.

In some embodiments, the bridge electrode 125 may be formed on an insulation layer (not illustrated). The insulation layer may at least partially cover the connecting portion 115 included in the first sensing electrode 110, and at least partially cover the second sensing electrodes 120 around the connecting portion 115. The bridge electrode 125 may penetrate through the insulation layer and may be electrically connected to the second sensing electrodes 120 adjacent to each other with the connecting portion 115 interposed therebetween.

The insulation layer may include an inorganic insulation material such as a silicon oxide or a silicon nitride, or an organic insulation material such as an acrylic resin or a siloxane resin.

The traces 130 and 135 may include a first trace 130 extending from each of the first sensing electrode rows and a second trace 135 extending from each of the second sensing electrode columns.

As illustrated in FIG. 4, the traces 130 and 135 may extend from a periphery of the display area D and be collected in the trace area T.

For example, the first trace 130 may be branched from each of the first sensing electrode rows from both lateral portions of the touch sensor layer 100 and may extend in the first direction. The first traces 130 may be bent while entering the trace area T to extend in the second direction. The first traces 130 may be bent again in the first direction to extend in the first direction in the connection area P.

In some embodiments, the first traces 130 may be alternately distributed on both lateral portions of the touch sensor layer. The first traces 130 may be evenly distributed on both lateral portions of the touch sensor layer so that stress generated during the bending operation as described below may be uniformly dispersed. Additionally, the first traces 130 may be alternately arranged on the both lateral portions so that an alignment margin between the neighboring first traces 130 may be increased.

The second traces 135 may each be branched from each second sensing electrode column and may extend in the second direction in the trace area T. The second traces 135 may be bent again in the first direction to extend in the first direction to the connection area P.

Terminal ends of the traces 130 and 135 may serve as connecting portions that may be collected in the connection area P and electrically connected to the flexible circuit board 160. A first connecting portion 140 and a second connecting portion 145 may be defined by the first trace 130 and the second trace 135, respectively, and may be disposed in the connection area P.

The traces 130 and 135 may include a conductive material substantially the same as or similar to that of the sensing electrodes 110 and 120.

In exemplary embodiments, the flexible circuit board 160 may be electrically connected to the connecting portions 140 and 145 on the connection area P. In some embodiments, a conductive intermediate structure such as an anisotropic conductive film (ACF) may be disposed between the flexible circuit board 160 and the connecting portions 140 and 145.

In exemplary embodiments, the supporting structure 170 may commonly cover the connection area P and the trace area T in a planar view. An adhesion between the flexible circuit board 160 and the touch sensor layer 100 may be enhanced by the supporting structure 170, so that mechanical failures such as detachment or cracks of the flexible circuit board 160 and/or the traces 130 and 135 may be prevented.

In some embodiments, the margin area M may be further included between the display area D and the trace area T. The margin area M may be an area where bending or folding of the touch sensor module may be initiated. Additionally, the margin area M may serve as a buffer area for transmitting a touch signal through the sensing electrodes 120 and 110 between the display area D and the trace area T.

The supporting structure 170 may extend to the margin area M in the planar view. In some embodiments, the supporting structure 170 may entirely cover the margin area M in the planar view.

In some embodiments, the supporting structure 170 may partially cover the margin area M so that the gap 155 may be formed, as illustrated in FIG. 1. In this case, the supporting structure 170 may also overlap the sensing electrodes 110 and 120 in the planar view. The optical layer 150 illustrated in FIG. 1 may entirely cover the display area D in the planar view. As described above, e.g., the spacing distance (e.g., the distance in the first direction) between the supporting structure 170 and the optical layer 150 may be about 500 μm or less, in a preferable embodiment, from about 50 to 500 μm.

The supporting structure 170 may cover some of the sensing electrodes 110 and 120 on the margin area M, so that mechanical defects such as fracture or delamination of the sensing electrodes 110 and 120 may be prevented when folding or bending occurs in the margin area M.

Referring to FIG. 5, sensing electrodes 127 and traces 137 of the touch sensor layer may be arranged to be operable in a self-capacitance type.

The touch sensor layer may include the sensing electrodes 127 each of which may be provided in an independent island pattern. Additionally, the traces 137 may be branched from each sensing electrode 127 to extend to the trace area T. Terminal ends of the traces 137 may be collected in the connection area P and may be electrically connected to the flexible circuit board 160.

As described above, the supporting structure 170 may commonly cover the touch sensor layer 100 and the flexible circuit board 160 on the trace area T and the connection area P. Additionally, the supporting structure 170 may extend on the margin area M to cover some of the sensing electrodes 127.

Figure 6:
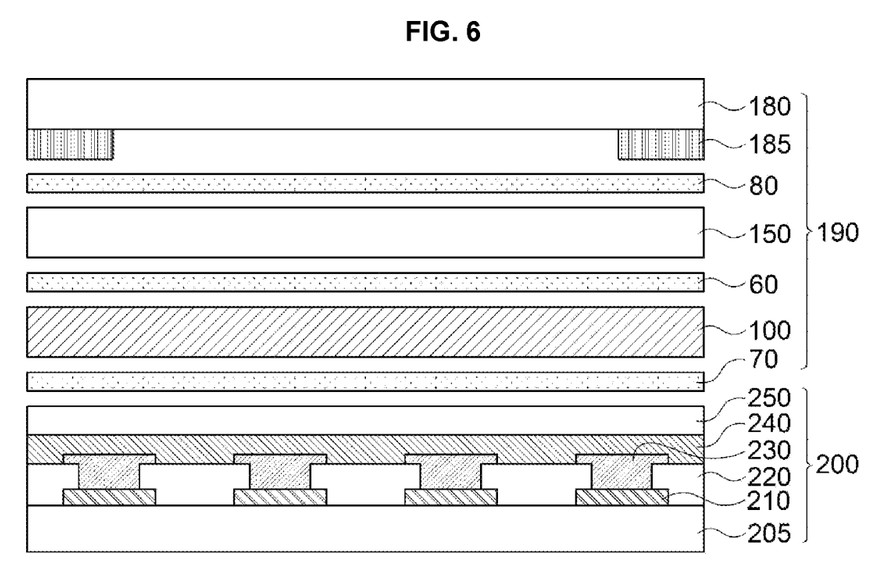
FIG. 6 is a schematic view illustrating a window stack structure and an image display device in accordance with exemplary embodiments.

FIG. 6 is a schematic view illustrating a window stack structure and an image display device in accordance with exemplary embodiments.

A window stack structure 190 may include a window substrate 180 and a touch sensor module according to exemplary embodiments as described above. The touch sensor module may include, e.g., the touch sensor layer 100 as described with reference to FIGS. 1 to 5 and the optical layer 150 stacked on the display area D of the touch sensor layer 100. For convenience of descriptions, illustration of the supporting structure 170 and the flexible circuit board 160 is omitted in FIG. 6 and will be described in more detail with reference to FIG. 7.

The window substrate 180 may include, e.g., a hard coating film. In an embodiment, a light-shielding pattern 185 may be formed on a peripheral portion of one surface of the window substrate 180. The light-shielding pattern 185 may include, e.g., a color-printed pattern, and may have a single-layered or multi-layered structure. A bezel portion or a non-display area of the image display device may be defined by the light-shielding pattern 185.

The optical layer 150 may include various optical films or optical structures included in the image display device. In some embodiments, the optical layer 150 may include a coating-type polarizer or a polarizing plate. The coating-type polarizer may include a liquid crystal coating layer that may include a cross-linkable liquid crystal compound and a dichroic dye. In this case, the optical layer 150 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The optical layer 150 may be directly attached to the surface of the window substrate 180 or may be attached via a third adhesive layer 80.

The touch sensor layer 100 may be included in the window stack structure 190 as a film or a panel. In an embodiment, the touch sensor layer 100 may be combined with the optical layer 150 via the first adhesive layer 60. In an embodiment, the first adhesive layer 60 may have the flexural rigidity within the above-described range.

As illustrated in FIG. 6, the window substrate 180, the optical layer 150 and the touch sensor layer 100 may be sequentially positioned from a viewer's side. In this case, sensing electrodes of the touch sensor layer 100 may be disposed under the optical layer 150 including the polarizer or the polarizing plate so that electrode patterns may be effectively prevented from being seen by the viewer.

In an embodiment, the window substrate 180, the touch sensor layer 100 and the optical layer 150 may be sequentially positioned from the viewer's side.

The image display device may include a display panel 200 and the window stack structure 190 disposed on the display panel. The window stack structure 190 may include the touch sensor module according to exemplary embodiments.

The display panel 200 may include a pixel electrode 210, a pixel defining layer 220, a display layer 230, an opposing electrode 240 and an encapsulation layer 250 disposed on a panel substrate 205.

The panel substrate 205 may include a flexible resin material. In this case, the image display device may be a flexible display.

A pixel circuit including a thin film transistor (TFT) may be formed on the panel substrate 205, and insulation layer covering the pixel circuit may be formed. The pixel electrode 210 may be electrically connected to, e.g., a drain electrode of the TFT on the insulation layer.

The pixel defining layer 220 may be formed on the insulation layer, and the pixel electrode 210 may be exposed through the pixel defining layer 220 such that a pixel region may be defined. The display layer 230 may be formed on the pixel electrode 210, and the display layer 230 may include, e.g., a liquid crystal layer or an organic light emitting layer.

The opposing electrode 240 may be disposed on the pixel defining layer 220 and the display layer 230. The opposing electrode 240 may serve as, e.g., a common electrode or a cathode of the image display device. The encapsulation layer 250 may be disposed on the opposing electrode 240 to protect the display panel 200.

In some embodiments, the display panel 200 and the window stack structure 190 may be combined through the second adhesive layer 70. For example, the protective film 50 may be removed from the touch sensor module described with reference to FIG. 2 or 3, and the touch sensor module may be laminated on the display panel 200 via the second adhesive layer 70. In an embodiment, the second adhesive layer 70 may have the flexural rigidity value within the above-described range.

Figure 7:
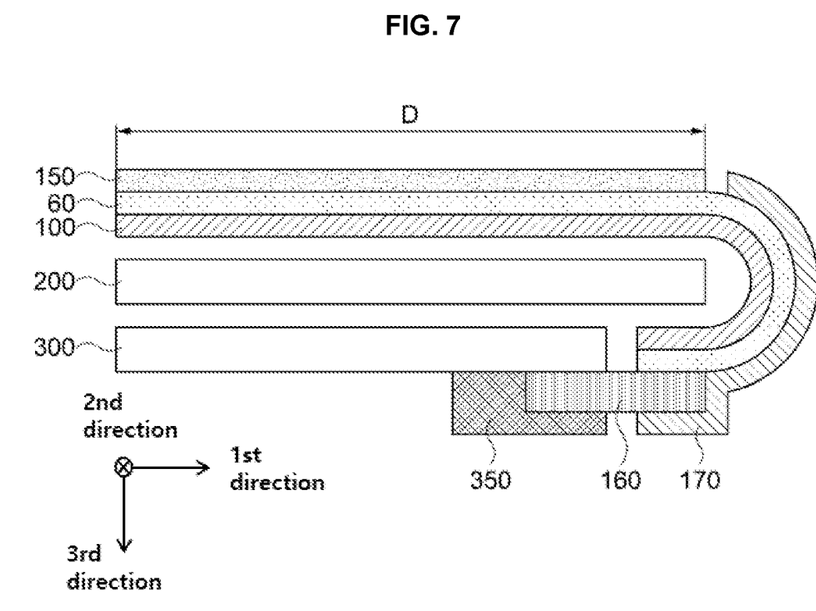
FIG. 7 is a schematic cross-sectional view illustrating an image display device combined with a touch sensor module in accordance with exemplary embodiments.

FIG. 7 is a schematic cross-sectional view illustrating an image display device combined with a touch sensor module in accordance with exemplary embodiments. For example, FIG. 7 illustrates a driving circuit connection of a touch sensor module via a flexible circuit board. For convenience of descriptions, an illustration of adhesive layers is omitted herein.

Referring to FIG. 7, the image display device may include the display panel 200 and a main board 300, and may include a touch sensor module according to exemplary embodiments as described above. The touch sensor module may include the touch sensor layer 100 and the optical layer 150 disposed on the display area D of the touch sensor layer 100.

As described with reference to FIG. 4 or FIG. 5, bending may be initiated from the margin area M of the touch sensor layer 100 and the bending may occur in the third direction (e.g., a thickness direction of the image display device) along the first direction. Accordingly, the connecting portions of the traces included in the connection area P may be electrically connected to the main board 300 via the flexible circuit board 160. The flexible circuit board 160 may be connected to, e.g., a bonding pad 350 formed on a bottom surface of the main board 300.

In an embodiment, an end portion (e.g., the connection area P and/or the trace area T) of the touch sensor module or the touch sensor layer 100 may be bent by 180 degrees (°) or more. Accordingly, the end portion may extend again in the first direction. The end portion may face a non-bent portion of touch sensor layer 100 in the third direction.

As described above, even though drastic bending is applied, the supporting structure 170 may fix a combination between the flexible circuit board 160 and the touch sensor layer 100, thereby suppressing fracture, separation, etc., of circuits, wiring, electrodes, etc. Further, the adhesive layer having the above-described flexural rigidity value may provide appropriate strength and bending resistance during the bending or bending, so that improved bending stability and reliability may be maintained.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

A touch sensor sample (manufactured by Dongwoo Fine-Chem) including electrode patterns and traces that had a thickness of 0.14 μm and were formed of ITO, and a 20 μm PET protective film attached thereto was prepared. A first adhesive layer was formed on a top surface of the touch sensor layer.

Specifically, n-butyl acrylate, methacrylate, benzyl methacrylate, acrylic acid and 4-hydroxybutyl acrylate, and azo-bisisobutylonitrile as an initiator were added to ethyl acetate and then reacted to prepare an acrylate copolymer solution. An isocyanate compound (manufactured by Nippon Urethane Industries, product name: Coronate-L) as a crosslinking agent was added to the copolymer solution and methyl ethyl ketone was used as a solvent to prepare an adhesive composition. The first adhesive layer having a thickness of 15 μm was prepared from the adhesive composition.

A polarizing plate that included a polyvinyl alcohol (PVA) polarizer having a thickness of 20 μm attached to a TAC protective film having a thickness of 80 μm was bonded to a central portion of the touch sensor layer by the first adhesive layer.

The traces at a terminal end portion of the touch sensor layer were connected to an FPCB, and a supporting structure was attached to cover the FPCB together at the terminal end portion of the touch sensor layer such that a spacing distance from the polarizing plate was maintained as 20 μm. An acryl-based tape (manufactured by Nitto Denko Corporation, product number: 360A) was cut to be used as the supporting structure.

A tensile modulus of the first adhesive layer was measured as 0.517 N/mm². Specifically, the tensile modulus was measured based on a standard of ASTM D638 using AG-X equipment of Shimazdu Corporation.

Example 2

A touch sensor module was manufactured by the same method as that in Example 1, except that the thickness of the first adhesive layer was adjusted to 30 μm and the tensile modulus of the first adhesive layer was changed.

Example 3

A touch sensor module was prepared by the same method as that in Example 1, except that a second adhesive layer having the same material, thickness and tensile modulus as those of the first adhesive layer used in Example 1 was formed between the touch sensor layer and the protective film.

Example 4

A touch sensor module was manufactured by the same method as that in Example 1, except that a first adhesive layer and a second adhesive layer having the same material, thickness and tensile modulus were formed on the top and bottom surfaces of the touch sensor layer, respectively.

Example 5

A touch sensor module was manufactured by the same method as that in Example 4, except that the thickness of the second adhesive layer was adjusted to 50 μm and the tensile modulus was changed.

Example 6

A touch sensor module was manufactured by the same method as that in Example 1, except that the spacing distance between the polarizing plate and the supporting structure was changed to 600 μm.

Comparative Example 1

A touch sensor module was manufactured by the same method as that in Example 1, except that the adhesive layer was omitted.

Comparative Example 2

A touch sensor module was manufactured by the same method as that in Example 1, except that the thickness of the second adhesive layer was adjusted to 5 μm and the tensile modulus was changed.

Comparative Example 3

A touch sensor module was manufactured by the same method as that in Example 1, except that the thickness of the second adhesive layer was adjusted to 30 μm and the tensile modulus was changed.

In the touch sensor modules of Examples and Comparative Examples, properties and the spacing distances of the adhesive layers are shown in Table 1 below.

TABLE 1

| | First Adhesive Layer | | | Second Adhesive Layer | | | Spacing Distance (μm) | Flexural Rigidity (N · nm) |
|---|---|---|---|---|---|---|---|---|
| | Thickness (μm) | Tensile Modulus (N/mm²) | Poisson's ratio | Thickness (μm) | Tensile Modulus (N/mm²) | Poisson's ratio | | |
| Example 1 | 15 | 0.517 | 0.35 | — | — | — | 200 | 0.17 |
| Example 2 | 30 | 0.247 | 0.35 | — | — | — | 200 | 0.63 |
| Example 3 | — | — | — | 15 | 0.517 | 0.35 | 200 | 0.17 |
| Example 4 | 15 | 0.517 | 0.35 | 15 | 0.517 | 0.35 | 200 | 0.17 |
| Example 5 | 15 | 0.517 | 0.35 | 50 | 0.300 | 0.35 | 200 | 0.77 |
| Example 6 | 15 | 0.517 | 0.35 | — | — | — | 600 | 0.17 |
| Comparative Example 1 | — | — | — | — | — | — | 200 | — |
| Comparative Example 2 | 5 | 0.213 | 0.35 | — | — | — | 200 | 0.01 |
| Comparative Example 3 | — | — | — | 30 | 2.153 | 0.35 | 200 | 5.52 |

Experimental Example

Figure 8:
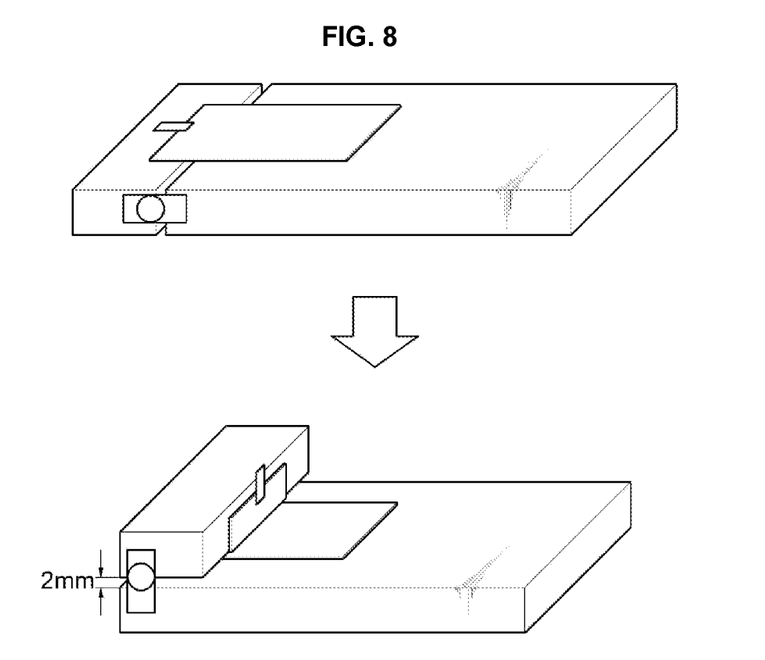
FIG. 8 is a schematic view illustrating a bending test evaluation apparatus/method.

A bending test at room temperature for 720 hr was performed using a 1R bending evaluation jig for each touch sensor module of the above-described Examples and Comparative Examples as illustrated in FIG. 8.

After the bending test, a delamination of the flexible circuit board (FPCB) and cracks of the traces included in the touch sensor layer were observed. The result when the delamination and the cracks were not observed is represented as "OK", and the result when the delamination/cracks were detected is represented as "NG".

Further, a touch sensor function was tested after the bending test using a touch sensor function tester. Specifically, the result when the sensing function was maintained is represented as "OK", and the result when the sensing function failed is represented as "NG" in Table 2 below.

TABLE 2

| | FPCB Delamination | Trace Cracks | Touch Sensing Function |
|---|---|---|---|
| Example 1 | OK | OK | OK |
| Example 2 | OK | OK | OK |
| Example 3 | OK | OK | OK |
| Example 4 | OK | OK | OK |
| Example 5 | OK | OK | OK |
| Example 6 | OK | NG | OK |
| Comparative Example 1 | NG | NG | NG |
| Comparative Example 2 | NG | NG | NG |
| Comparative Example 3 | NG | NG | NG |

Referring to Table 2, in Examples including the adhesive layers within the above-described flexural rigidity range, the touch sensing function was maintained while achieving stability of the flexible circuit board and the touch sensor layer.

In Comparative Examples where the adhesive layer was omitted or the flexural rigidity was not within the above-described range, the touch sensing function was not implemented, and the structural delamination and damages occurred.

What is claimed is:

1. A touch sensor module, comprising:
   a touch sensor layer comprising sensing electrodes and traces branching from the sensing electrodes;
   a flexible circuit board electrically connected to the traces at one end portion of a top surface of the touch sensor layer;
   a supporting structure commonly and partially covering the flexible circuit board and the touch sensor layer; and
   an adhesive layer formed on a top surface of the touch sensor layer,
   wherein the flexible circuit board and the supporting structure are disposed on a top surface of the adhesive layer to be in contact with the top surface of the adhesive layer,
   wherein the adhesive layer has a flexural rigidity defined by Equation 1 in a range from 0.01 to 5 N·mm:

Flexural Rigidity=$Eh^3/12(1-v^2)$     [Equation 1]

wherein, in Equation 1, E represents a tensile modulus (MPa) of the adhesive layer, h represents a thickness (μm) of the adhesive layer, and v represents a Poisson's ratio of the adhesive layer.

2. The touch sensor module according to claim 1, wherein the adhesive layer comprises a second adhesive layer formed on a bottom surface of the touch sensor layer.

3. The touch sensor module according to claim 2, further comprising a protective film combined with the touch sensor layer via the second adhesive layer.

4. The touch sensor module according to claim 1, wherein the adhesive layer comprises a first adhesive layer and a second adhesive layer formed on the top surface and a bottom surface of the touch sensor layer, respectively; and
   at least one of the first adhesive layer and the second adhesive layer has the flexural rigidity in the range from 0.01 to 5 N·nm.

5. The touch sensor module according to claim 1, wherein the adhesive layer has the flexural rigidity in a range from 0.1 to 1 N·nm.

6. The touch sensor module according to claim 1, wherein the touch sensor layer comprises a display area in which the sensing electrodes are disposed, a trace area in which the traces are disposed, and a connection area in which terminal end portions of the traces are disposed.

7. The touch sensor module according to claim 6, wherein the flexible circuit board is electrically connected to the terminal end portions of the traces in the connection area, and the supporting structure covers the connection area and the trace area in a planar view.

8. The touch sensor module according to claim 7, wherein the touch sensor layer further comprises a margin area in which some of the sensing electrodes are arranged, and the margin area is interposed between the display area and the trace area.

9. The touch sensor module according to claim 8, wherein the supporting structure covers the margin area in the planar view.

10. The touch sensor module according to claim 6, further comprising an optical layer disposed on the display area of the touch sensor layer, and the supporting structure and the optical layer are spaced apart in a horizontal direction to form a gap.

11. The touch sensor module according to claim 10, wherein a spacing distance between the optical layer and the supporting structure is 500 μm or less.

12. The touch sensor module according to claim 10, wherein the optical layer includes at least one of a polarizer, a polarizing plate, a retardation film, a reflective sheet, a brightness enhancing film or a refractive index matching film.

13. The touch sensor module according to claim 1, wherein the supporting structure comprises a substrate layer and a supporting layer formed on the substrate layer, and the supporting layer includes an adhesive material.

14. The touch sensor module according to claim 13, wherein the supporting layer contacts the flexible circuit board and the touch sensor layer.

15. A window stack structure, comprising:

a window substrate; and the touch sensor module according to claim 1, stacked on one surface of the window substrate.

16. An image display device, comprising:

a display panel; and the touch sensor module according to claim 1, stacked on the display panel.

17. The image display device according to claim 16, further comprising a main board disposed under the touch sensor module, wherein a portion of the touch sensor layer of the touch sensor module and the flexible circuit board are bent together with the supporting structure to be electrically connected to the main board.

* * * * *